C. H. STAGE.
STEAM COOKING UTENSIL.
APPLICATION FILED JULY 20, 1907.
912,912.
Patented Feb. 16, 1909.
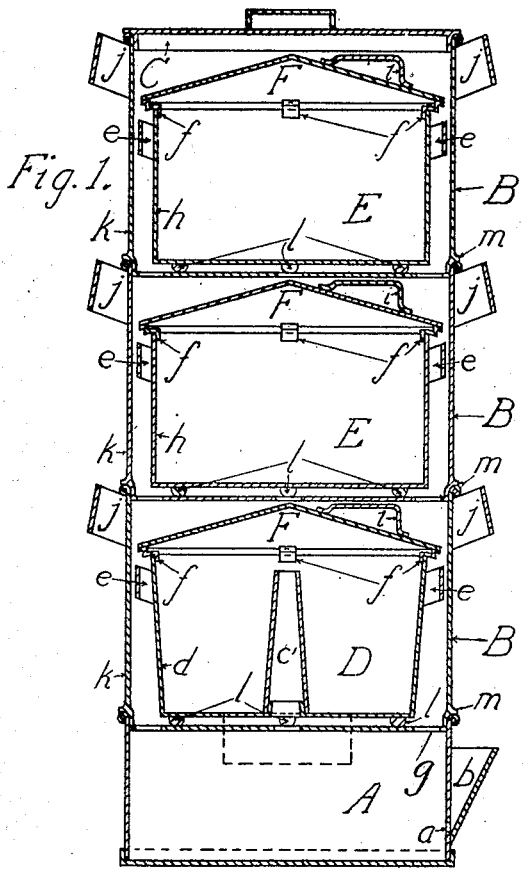
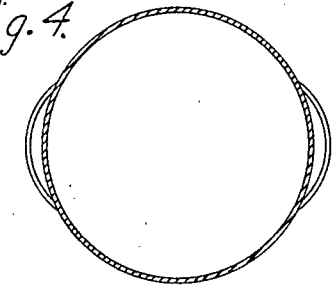
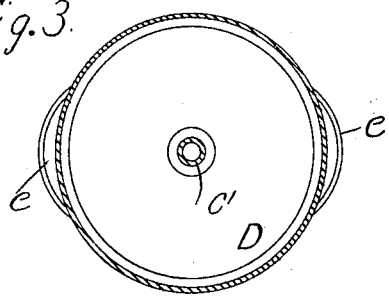
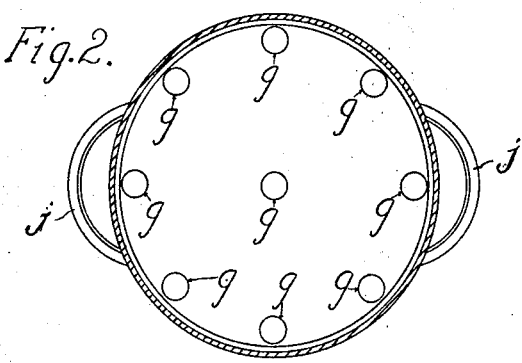
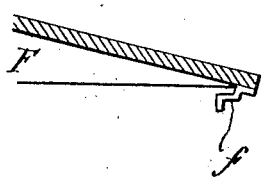
WITNESSES:
Guy N. Dawson
Charles B. Haley
INVENTOR
Clarence H. Stage
BY
Victor J. Evans
ATTORNEY.

UNITED STATES PATENT OFFICE.

CLARENCE H. STAGE, OF PHILADELPHIA, PENNSYLVANIA.

STEAM COOKING UTENSIL.

No. 912,912.  Specification of Letters Patent.  Patented Feb. 16, 1909.

Application filed July 20, 1907. Serial No. 384,714.

*To all whom it may concern:*

Be it known that I, CLARENCE H. STAGE, a citizen of the United States, residing at Philadelphia, in the county of Philadelphia and State of Pennsylvania, have invented new and useful Improvements in Steam Cooking Utensils, of which the following is a specification.

This invention is an improved steam cooking utensil comprising a plurality of separable outer vessels and a plurality of inner vessels disposed in all of the outer vessels excepting the lowermost and removable therefrom and provided with detachable covers so constructed and related thereto as to prevent the contents of such inner vessels from being injured by the water resulting from the condensation of steam therein, as hereinafter described and claimed.

In the accompanying drawing, Figure 1 is a vertical sectional view of a steam cooking utensil embodying my invention, showing the several vessels thereof assembled. Fig. 2 is a horizontal sectional view of one of the outer upper vessels. Fig. 3 is a similar view of the lower inner vessel. Fig. 4 is a similar view of one of the upper inner vessels. Fig. 5 is a detail sectional view, showing one of the covers and one of the clips on the under side thereof.

In accordance with my invention, I provide a vessel A which constitutes the boiler and the base section of the outer vessels which are disposed in superimposed relation. The said boiler or base section A is provided on one side with a spout $b$ at the lower end of which is an opening $a$. The upper side of the said boiler or base section is open. The said boiler or base section may be of any suitable form, but is here shown as cylindrical.

In connection with such boiler or base section I provide a plurality of outer vessels B of which any suitable number may be used, three being here shown for the purposes of this specification. The said vessels B correspond in shape with the base or boiler vessel or section A. Each is open at the upper side, is provided on opposite sides with handles $j$ and is provided near its bottom on its outer side with an outwardly extending circumferential annular flange $m$ to bear on the outer edge of the wall $k$ of another vessel B, or on the upper edge of the wall of the boiler or base vessel A, as the case may be. The said flanges serve to support the said vessels B in superincumbent relation as will be understood from the foregoing and by reference to Fig. 1 of the drawings. The bottom of each of the said vessels B is provided with a suitable number of openings $g$ for the passage of steam from one vessel to another so that steam generated in the boiler or base vessel A will pass therefrom into and through all of the vessels B in the stack. A lid C is provided for the uppermost outer vessel B to prevent the escape of steam from the stack of such vessel.

An inner vessel may be placed in or removed from each of the outer vessels B. The inner vessel D shown in Fig. 1 in the lowest vessel B is provided with a tubular upwardly tapered open stack $c'$ and is especially adapted for cooking brown bread, puddings and dough of various kinds. Each of the inner vessels is provided on its under side with a plurality of supporting feet $l$ to bear on the bottom of the outer vessel B in which such inner vessel is placed and space the bottom of such inner vessel above the said outer vessel to allow the free passage of steam between them. Each inner vessel is smaller than the outer vessel in which it is placed so that a space is formed between walls of such inner and outer vessel to admit of the free circulation of steam between them and around, under and above each inner vessel. Each inner vessel is provided with handles $e$ and with a conical lid F. Said lid at its base exceeds the diameter of the upper side of the inner vessel so as to extend beyond and overhang the same and is provided with clips $f$ which bear on the upper edge of the wall of the inner vessel and space such lid or cover therefrom, as shown in Fig. 1. Such cover or lid is further provided, on its upper side, with a handle $i$. The wall $d$ of the lower inner vessel B flares upwardly. The wall $h$ of each upper inner vessel E is cylindrical in form.

The food to be steamed is placed in the inner vessels D, E and the steam which rises through the openings $g$ from the boiler serves to cook the food. Such steam as condenses on and in the conical ends F passes down the inclined surfaces thereof and drops from the outer edges thereof which overhang and project laterally beyond the walls of the inner vessels and is hence returned to the boiler or base vessel A and prevented from moistening the contents of the said inner vessels and injuring such contents.

The cooker may be employed for canning purposes by removing the inner vessels and placing the jars or other vessels containing the goods to be canned in the outer vessels and steaming the same therein.

Having thus described the invention, what I claim as new and desire to secure by Letters Patent is:—

A steam cooker comprising a sectional outer casing built up of a stack of superimposed sections, the bottom of which forms a boiling water receptacle while the remaining sections have perforated bottoms, and a series of vessels arranged within said casing sections and each comprising supporting feet or projections to space the bottoms of the vessels from the bottoms of the casing sections, and conical lids for the vessels each having a diameter in excess of the diameter of its respective vessel and provided with offsetting clips to leave an annular steam circulating space between the cover and vessel, one or more of said vessels having a central vertical steam flue open at both ends and extending from the bottom upward and terminating beneath the plane of the top of said vessel.

In testimony whereof, I affix my signature in presence of two witnesses.

CLARENCE H. STAGE.

Witnesses:
　OSCAR J. CRESSMAN,
　CHAS. B. HALEY.